Jan. 17, 1939.                     D. W. COOTE                         2,144,363
              SYSTEM FOR THE DISTRIBUTION OF ELECTRICAL ENERGY
                       Filed Feb. 6, 1935          2 Sheets-Sheet 1

Fig. 1.

INVENTOR
Donald W. Coote
BY
Ward, Crosby & Neal
ATTORNEYS

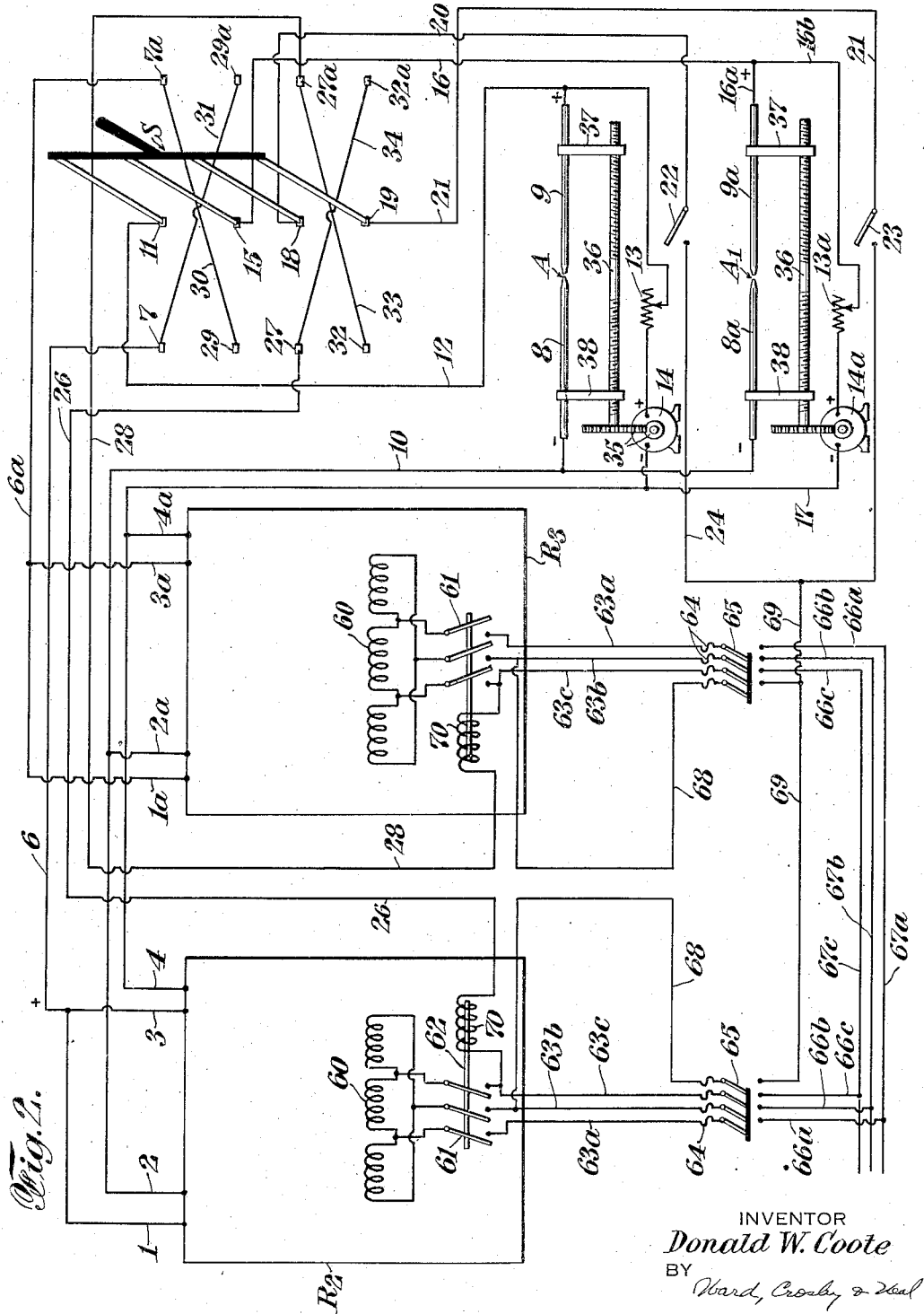

Patented Jan. 17, 1939

2,144,363

UNITED STATES PATENT OFFICE 2,144,363

SYSTEM FOR THE DISTRIBUTION OF ELECTRICAL ENERGY

Donald W. Coote, Baldwin, N. Y., assignor to Trans-Lux Corporation, a corporation of Delaware Application February 6, 1935, Serial No. 5,202

4 Claims. (Cl. 176—12)

My invention relates to a switching system utilizable for connecting any one of a plurality of rectifiers, transformers or other electrical energy distributing units alternately to different energy consuming arrangements such as motors, arc light sources or other electrical devices at will.

My invention has further reference to a switching system and circuit arrangement adapted for simple manual control whereby a desired circuit relation may be readily established between a plurality of electrical energy distributing units and a plurality of electrical devices.

Various other objects, advantages and characteristics of my invention will become apparent from the following detailed description.

My invention resides in the switching system, circuit arrangement, features and combinations of the character hereinafter described and claimed.

For an understanding of my invention and for an illustration of some of the many forms thereof, reference is to be had to the accompanying drawings, in which:

Figure 1 is representative of a switching system as constructed in accordance with my invention; and Fig. 2 is representative of a modified form of switching system.

It is well known in the motion picture projection art that a plurality of projector mechanisms must be provided if the resultant projection of the motion pictures is to be of the continuous type. Each projector mechanism necessarily includes an arc or equivalent light source for producing the projecting light beam and it is customary for such arc light sources to be of the type requiring the supply of direct current thereto for operating purposes, this direct current ordinarily being obtained from motor-generator sets or vacuum tube rectifiers energized from alternating current mains. To this end, it has been the practice to associate one rectifier with each arc light source and to provide a reserve rectifier which may be utilized in the event that one of the normally used rectifiers becomes inoperative. Obviously, such an arrangement presents certain disadvantages from the viewpoint of added expense, additional space required and lack of facility of operation.

In general, by my invention, I have improved upon the art as last described by providing a single rectifier for each arc light source, the rectifiers and arc light sources being connected in such suitable circuit relation that manual operation of a switch instantly and automatically substitutes one rectifier for another so that, in case of failure of the rectifier normally associated with one arc light source, the work of only a moment is required to substitute therefor, in fully operative relation, the rectifier normally associated with another arc light source.

For a more specific description of my invention, reference is to be had to Fig. 1 of this application wherein R and R1 represent separate rectifying units of any suitable character such, for example, as those which comprise vacuum tube arrangements for producing rectified electrical currents utilizable for energizing the above described arc light source and allied apparatus of commercial motion picture projectors. These rectifying units are supplied with alternating current in suitable manner as hereinafter described. As shown, the rectifying unit R comprises two sets of output conductors 1, 2 and 3, 4. Similarly, the rectifying unit R1 comprises two sets of output conductors 1a, 2a and 3a, 4a.

The conductors 1 and 3 of the unit R are of the same polarity, for example, positive polarity, and these conductors are connected to a common conductor 6 which leads to a contact member 7 of a manually operable switch S. In the same manner, the conductors 1a and 3a, which, likewise, are of positive polarity, are connected to a common conductor 6a which extends to the contact member 7a of said switch S.

As shown on the drawings, A and A1 represent the respective arc light sources of individual motion picture projectors utilizable alternately for projecting motion pictures on a screen in the customary manner. In accordance with standard practice, the light source A comprises the spaced electrodes 8, 9 and the light source A1 comprises the spaced electrodes 8a, 9a.

In accordance with the invention, the negative polarity conductors 2, 2a of the rectifying units are connected to a common conductor 10 which leads to the negative arc light electrodes 8, 8a.

Further in accordance with the invention, the switch terminal member 11 has connected thereto a conductor 12 which leads, by way of conductor 12a, to the positive arc light electrode 9, said conductor 12 also leading, by way of conductor 12b, in which may be included a variable resistance unit 13, to the positive terminal of an electric motor 14. Further, as shown, the switch terminal member 15 has a conductor 16 connected thereto, said conductor 16 terminating in a pair of branching conductors 16a and 16b, the conductor 16a leading to the positive arc light electrode 9a and the conductor 16b, in which may be included a variable resistance unit 13a, leading to the positive terminal of an electric motor 14a. The negative terminals of the motors 14, 14a are connected to a common conductor 17 which leads to and is connected to the negative potential output conductors 4, 4a of the rectifiers R, R1.

The switch contact members 18, 19 have connected thereto the respective conductors 20, 21 which extend, individually, to corresponding terminals of the respective switches 22 and 23, the other corresponding terminals of which are connected to a common conductor 24 which leads to one terminal of a suitable source of alternating current, not shown, but utilizable for energizing the system herein described.

The other terminal of said source of alternating current has connected thereto a conductor 25 which leads to individual input terminals of the respective rectifiers R, R1. The other input terminal of the rectifier R has connected thereto a conductor 26 which leads to the contact member 27 of the switch S. Likewise, the other input terminal of rectifier R1 is connected to a conductor 28 which extends to the contact member 27a of said switch S.

As herein illustrated and in accordance with the disclosed form of the invention, the switch S is of the four-pole, double-throw type. The contact members 29, 29a are connected, respectively, to the aforesaid contact members 7a, 7 by the respective conductors 30, 31. Furthermore, the contact members 32, 32a of said switch S are connected, respectively, to the above described contact members 27a, 27 by the respective conductors 33, 34.

The herein described motors 14, 14a are utilizable for controlling movement of the electrodes of the respective arc light sources with respect to each other in accordance with the rate of electrode consumption. To this end, any suitable arrangement may be utilized such, for example, as illustrated wherein the armature shaft of each motor is connected by a worm and worm gear arrangement 35 to a shaft 36 provided with sets of oppositely pitched threads as illustrated. Coactable, respectively, with these sets of threads are the supporting members 37 and 38, the members 37 supporting the respective electrodes 8 and 8a, and the members 38 supporting the respective electrodes 9 and 9a.

It will be understood that the rectifiers R and R1 are duplicates and further it will be understood that the arc light sources A and A1 together with the corresponding respective parts thereof are of duplicate character at least as regards electrical loading. The sets of conductors 1, 2 and 1a, 2a may properly be considered as constituting separate circuits, the voltage thereacross being of the proper magnitude to operate either set of electrodes as disclosed. Similarly, the sets of conductors 3, 4 and 3a, 4a may properly be considered as defining separate circuits, each having a voltage thereacross of the proper magnitude to operate either of the motors 14 or 14a.

Accordingly, with the switch S thrown to its position at the left, i. e., when the conductive blades thereof are in engagement with the respective contact members 7, 29, 27 and 32, the herein described system may be operated as follows:

Closure of the switch 22 causes the input side of the rectifier R to be energized over a circuit which extends from one terminal of the input source of current, thence by way of conductor 24, switch 22, conductor 20, contact member 18, the switch blade connected thereto, contact member 27, conductor 26, the input side of rectifier R, and thence by way of conductor 25 back to the other terminal of the input source of current. When the input side of the rectifier R is energized as just described, current is supplied from the output side thereof to the electrodes 8 and 9 of the arc light source A over a circuit which includes the conductor 1, conductor 6, contact member 7, the blade of switch S connected thereto, contact member 11, conductor 12, conductor 12a, electrode 9, electrode 8, and thence to the conductor 2 by way of conductor 10. At the same time, a circuit is established through the motor 14 of the arc light source A by way of the conductor 3, conductor 6, contact member 7, the blade of switch S connected thereto, contact member 11, conductor 12, conductor 12b, the motor 14, and thence to the conductor 4 by way of the conductor 17. Accordingly, it follows that with the switch S in its position at the left, the electrodes 8, 9 and the motor 14 are energized from the rectifier R upon closure of the switch 22.

While the switch S remains in its position at the left as above described, closure of the switch 23 causes the input side of the rectifier R1 to be energized over a circuit which extends from one terminal of the input source of current, thence by way of conductor 24, switch 23, conductor 21, contact member 19, the switch blade connected thereto, contact member 32, conductor 33, contact member 27a, conductor 28, the input side of the rectifier R1, and thence by way of conductor 25 back to the other terminal of the input source of current. When the input side of the rectifier R1 is energized as just described, current is supplied from the output side thereof to the electrodes 8a and 9a of the arc light source A1 over a circuit which includes the conductor 1a, conductor 6a, contact member 7a, conductor 30, contact member 29, the blade of switch S connected thereto, contact member 15, conductor 16, conductor 16a, electrode 9a, electrode 8a and thence to the conductor 2a by way of the conductor 10. At the same time, a circuit is established through the motor 14a of the arc light source A1 by way of conductor 3a, conductor 6a, contact member 7a, conductor 30, contact member 29, the blade of switch S connected thereto, contact member 15, conductor 16, conductor 16b, the motor 14a, and thence to the conductor 4a by way of conductor 17. Accordingly, it follows that with the switch S in its position at the left, the electrodes 8a, 9a and the motor 14a are energized upon closure of the switch 23.

With the switch S in its position at the left as described above, the contact members 29a and 32a are "open". As will readily be understood from a consideration of the drawings, due to the gap between the conductor 16 at its terminal contact member 15 and the contact member 29a, it is impossible to connect the rectifier R to the arc light source A1 and, by reason of the gap between the conductor 12 at its contact member 11 and the contact member 7a, it is likewise impossible to connect the rectifier R1 to the arc light source A. Furthermore, by reason of the fact that the conductor 20 at its terminal contact member 18 is not connected to the contact member 27a, when the switch S is in its position at the left, it follows that the switch 22 may not be utilized for energizing the input side of the rectifier R1. Still further, due to the fact that the conductor 21 at its terminal contact member 19 is disconnected from the contact member 32a, when the switch S is in the position last noted, it necessarily follows that the switch 23 may not be utilized for energizing the input side of the rectifier R.

With the switch S thrown to its position at the right, i. e., when the conductive blades thereof are in engagement with the respective contact members 7a, 29a, 27a, and 32a, the herein described system may be operated as follows:

Closure of the switch 22 causes the input side of the rectifier R1 to be energized over a circuit which extends from one terminal of the input source of current, thence by way of conductor 24, switch 22, conductor 20, contact member 18, the switch blade connected thereto, contact member 27a, conductor 28, the input side of the rectifier R1, and thence by way of conductor 25 back to the other terminal of the input source of current. When the input side of the rectifier R1 is energized as just described, current is supplied from the output side thereof to the electrodes 8 and 9 of the arc light source A over a circuit which includes the conductor 1a, conductor 6a, contact member 7a, the blade of switch S connected thereto, contact member 11, conductor 12, conductor 12a, electrode 9, electrode 8, and thence to the conductor 2a by way of the conductor 10. At the same time, a circuit is established through the motor 14 of the arc light source A by way of the conductor 3a, conductor 6a, contact member 7a, the blade of switch S connected thereto, contact member 11, conductor 12, conductor 12b, the motor 14, and thence to the conductor 4a by way of the conductor 17. Accordingly, it follows that, with the switch S in its position at the right, the electrodes 8, 9 and the motor 14 are energized from the rectifier R1 upon closure of the switch 22.

While the switch S remains in its position at the right as above described, closure of the switch 23 causes the input side of the rectifier R to be energized over a circuit which extends from one terminal of the input source of current, thence by way of conductor 24, switch 23, conductor 21, contact member 19, the switch blade connected thereto, contact member 32a, conductor 34, contact member 27, conductor 26, the input side of the rectifier R, and thence by way of conductor 25 back to the other terminal of the input source of current. When the input side of the rectifier R is energized as just described, current is supplied from the output side thereof to the electrodes 8a and 9a of the arc light source A1 over a circuit which includes the conductor 1, conductor 6, contact member 7, conductor 31, contact member 29a, the switch blade connected thereto, contact member 15, conductor 16, conductor 16a, electrode 9a, electrode 8a and thence to the conductor 2 by way of the conductor 10. At the same time, a circuit is established through the motor 14a of the arc light source A1 by way of the conductor 3, conductor 6, contact member 7, conductor 31, contact member 29a, the blade of switch S connected thereto, contact member 15, conductor 16, conductor 16b, the motor 14a, and thence to the conductor 4 by way of the conductor 17. Accordingly, it follows that, with the switch S in its position at the right, the electrodes 8a, 9a and the motor 14a are energized from the rectifier R upon closure of the switch 23.

With the switch S in its position at the right as described above, the contact members 29 and 32 are "open". As will readily be understood from a consideration of the drawings, due to the gap between the conductor 16 at its terminal contact member 15 and the contact member 29, it is impossible to connect the rectifier R1 to the arc light source A1. Furthermore, by reason of the fact that the conductor 20 at its terminal contact member 18 is not connected to the contact member 27, when the switch S is in its position at the right, it follows that the switch 22 may not be utilized for energizing the input side of the rectifier R. Still further, due to the fact that the conductor 21 at its terminal contact member 19 is disconnected from the contact member 32, when the switch S is in the position last noted, it necessarily follows that the switch 23 may not be utilized for energizing the input side of the rectifier R1.

From the foregoing, it follows that, with the switch S in its position at the left, the rectifier R is adapted to operate the arc light source A and its motor 14, the rectifier R1 being adapted to operate the arc light source A1 and its motor 14a. Furthermore, when the switch S is in the position last noted, the switch 22 functions to energize only the rectifier R while the switch 23 functions to energize only the rectifier R1.

Accordingly, with the switch 22 closed and with the switch 23 open, the arc light source A is energized by the rectifier R. If this rectifier should suddenly become defective, it is necessary only to throw the switch S from its position at the left to its position at the right. This operatively connects the rectifier R1 to the arc light source A while leaving the latter under the control of the switch 22.

At the conclusion of the reel of film passing through the projector mechanism of which the arc light source A is a part, if the rectifier R has not been repaired, the operator restores the switch S to its position at the left, opens the switch 22 and closes the switch 23. This energizes the arc light source A1 under the control of the rectifier R1 and, since these operations may be effected in a moment, the continuity of the motion picture presentation is not broken.

Accordingly, in view of the foregoing, it follows that if the necessity arises, the arc light sources A and A1 may be operated under the control of a single rectifier or, alternatively, either arc light source may be operated by either rectifier while repairs are being effected on the other rectifier. The change-over operations may be performed in a simple manual manner with great reliability of operation. During normal operation, the switch S remains stationary in either position as desired but, at the same time, this switch is available for performing its intended purpose in case of emergency.

The switches 22 and 23 are the usual switches which are mounted on the respective frames of motion picture projectors. Heretofore, they serve so that the operator may energize the particular projector mechanism which is to be placed in service. By my invention, these switches serve the same purpose and, of importance, it should be noted that the switch 22 always operates the arc light source A and the switch 23 always operates the arc light source A1 no matter which rectifier is connected to the respective arc light sources.

In those cases wherein the electrode-controlling motors have different loading characteristics than the arc light sources, it will be understood that separate circuit arrangements should be provided as illustrated. However, in those cases wherein the loading characteristics of the motors and arc light sources are the same or substantially so, the motors may be connected directly across the circuit of said arc light sources.

In the form of the invention shown in Fig. 2, there are illustrated two electrical energy distributing units R2 and R3 such, for example, as rectifiers of the character hereinbefore described in connection with Fig. 1. In a diagrammatic manner, the apparatus included in each of the units R2 and R3 is shown as comprising a transformer winding 60 having three terminals to which are connected the respective conductive blades of a switch 61, these switch blades being secured to an actuating member 62 operable by electro-magnetic means in the manner hereinafter described.

The blades of each switch 61 are coactable with the respective terminals of a set of conductors 63a, 63b and 63c, each of these conductors including a fuse 64 and being connected to the respective blades of a primary line switch 65. The blades of the switch 65 are coactable with the terminals of a set of conductors 66a, 66b, 66c which are connected to the respective conductors of a suitable power circuit comprising the conductors 67a, 67b, 67c traversed by three-phase alternating current.

As shown, each of the primary line switches 65 is of the four-blade type and, connected to the extra blade thereof, is a conductor 68, which includes a fuse 64, and is connected to the adjacent conductor 63b. The extra terminals of the switches 65 are connected together by a conductor 69 to which is connected a conductor 24 corresponding with the similar conductor of Fig. 1.

As shown in Fig. 2, each of the units R2 and R3 comprises a coil 70, one end of each coil being connected to a conductor 63c and the other end of the coil 70 of the unit R2 being connected to a conductor 26 while the other end of the coil 70 of the unit R3 is connected to a conductor 28. The coils 70, in the manner hereinafter described, are adapted to operate the respective switches 61 and 62 of the units R2, R3.

For purposes of explanation of the invention, the rectifier units of Fig. 2 have been shown, the same as in Fig. 1, as adapted to supply direct current to the arc light units of individual motion picture projectors. In so far as the supply of direct current is concerned, the circuits are the same in both instances and, hence, with respect to the direct current circuits, the same reference characters have applied in both figures.

In Fig. 1, a conductor 24 is shown as common to both of the switches 22 and 23, and this conductor 24 leads directly to one side of the input source of current. In substance, the arrangement is no different in Fig. 2 since the conductor 24 of this figure leads to the conductor 69 which, by either of the primary line switches 65, may be connected to a conductor 68 which leads, by way of conductors 63b, 66b, to the line conductor 67b.

In Fig. 1, a conductor 26 is shown as leading from the contact member 27 of the switch S to the input side of the rectifier unit R. Similarly, in Fig. 2, the conductor 26 leads from the contact member 27 of switch S to the input conductor 63c of unit R2 by way of the coil 70.

Furthermore, in Fig. 1, a conductor 28 is shown as leading from the contact member 27a of switch S to the input side of the rectifier unit R1. Similarly, in Fig. 2, the conductor 28 leads from the switch contact member 27a to the input conductor 63c of unit R3 by way of the coil 70.

The operation of the form of the invention shown in Fig. 2 is as follows:

With the primary line switches 65 closed, the three-phase input circuit is extended to the terminals of the respective sets of conductors 63a, 63b and 63c.

With the control switch S in its position at the left, Fig. 2, closure of the switch 22 completes a circuit which extends from the input conductor 63c of the group of conductors supplying electrical current to the rectifier R2, thence by way of coil 70 of said rectifier R2, conductor 26, contact member 27, the blade of switch S connected thereto, contact member 18, conductor 20, switch 22, conductor 24, conductor 69, that blade of the primary line switch 65 for the rectifier R2 which is associated with conductor 69, conductor 68 and thence back to another conductor of the input supply of electrical current for the rectifier R2, namely, the conductor 63b. Completion of the circuit just described results in the passage therethrough of single phase alternating current which energizes the coil 70 of rectifier R2. Energization of said coil 70 actuates the switch 61 to close the same whereby the rectifier R2 is energized to produce a flow of direct current from the output side thereof, such direct current passing to the electrodes 8 and 9 of the arc light source A and to the motor 14 of said arc light source A in the same manner as hereinbefore described in connection with Fig. 1.

While the switch S remains in its position at the left as described immediately above, closure of the switch 23 completes a circuit which extends from the input conductor 63c of the group of conductors supplying electric current to the rectifier R3, thence by way of coil 70 of said rectifier R3, conductor 28, contact member 27a, conductor 33, contact member 32, the blade of switch S connected thereto, contact member 19, conductor 21, switch 23, conductor 24, conductor 69, that blade of the primary line switch 65 for the rectifier R3 which is associated with conductor 69, conductor 68 and thence back to another conductor of the input supply of electric current for the rectifier R3, namely, the conductor 63b. Completion of the circuit just described results in the passage therethrough of single phase alternating current which energizes the coil 70 of the rectifier R3. Energization of said coil 70 actuates the switch 61 to close the same whereby the rectifier R3 is energized to produce a flow of direct current from the output side thereof, such direct current passing to the electrodes 8a, 9a of the arc light source A1 and to the motor 14a of said arc light source A1 in the same manner as hereinbefore described in connection with Fig. 1.

With the switch S in its position at the left as described immediately above, the contact members 29a and 32a are "open". Hence, as will readily be understood, due to the gap between the conductor 16 and its terminal contact member 15 and the contact member 29a, it is impossible to connect the rectifier R2 to the arc light source A1 and, by reason of the gap between the conductor 12 at its contact member 11 and the contact member 7a, it is likewise impossible to connect the rectifier R3 to the arc light source A. Furthermore, by reason of the fact that the conductor 20 at its terminal contact member 18 is not connected to the contact member 27a, when the switch S is in its position at the left, it follows that the switch 22 may not be utilized for energizing the input side of the rectifier R3. Still further, due to the fact that the conductor 21 at its terminal contact member 19, is disconnected from the contact member 32a, when said switch S is in its position at the left, it necessarily follows that the switch 23 may not be utilized for energizing the input side of the rectifier R2.

With the switch S thrown to its position at the right, i. e., when the conductive blades thereof are in engagement with their respective contact members 7a, 29a, 27a and 32a, the herein described system may be operated as follows:

Closure of the switch 22 completes a circuit which extends from the input conductor 63c of the group of conductors supplying electric current to the rectifier R3, thence by way of coil 70 of said rectifier R3, conductor 28, contact member 27a, the blade of switch S connected thereto, contact member 18, conductor 20, switch 22, conductor 24, conductor 69, that blade of the primary line switch 65 for the rectifier R3 which is associated with conductor 69, conductor 68 and thence back to another conductor of the input supply of electrical current for the rectifier R3, namely, the conductor 63b. Completion of the circuit just described results in the passage therethrough of single phase alternating current which energizes the coil 70 of rectifier R3. Energization of said coil 70 actuates the switch 61 to close the same whereby the rectifier R3 is energized to produce a flow of direct current from the output side thereof, such direct current passing to the electrodes 8, 9 of the arc light source A and to the motor 14 of said arc light source A in the same manner as hereinbefore described in connection with Fig. 1.

While the switch S remains in its position at the right as described immediately above, closure of the switch 23 completes a circuit which extends from the input conductor 63c of the group of conductors supplying electrical current to the rectifier R2, thence by way of coil 70 to said rectifier R2, conductor 26, contact member 27, conductor 34, contact member 32a, the blade of switch S connected thereto, contact member 19, conductor 21, switch 23, conductor 24, conductor 69, that blade of the primary line switch 65 for the rectifier R2 which is associated with conductor 69, conductor 68 and thence back to another conductor of the input supply of electrical current for the rectifier R2, namely, the conductor 63b. Completion of the circuit just described results in the passage therethrough of single phase alternating current which energizes the coil 70 of rectifier R2. Energization of said coil 70 actuates the switch 61 to close the same whereby the rectifier R2 is energized to produce a flow of direct current from the output side thereof, such direct current passing to the electrodes 8a, 9a of the arc light source A1 and to the conductor 14a of said arc light source A1 in the same manner as hereinbefore described in connection with Fig. 1.

With the switch S in its position at the right as described immediately above, the contact members 29 and 32 are "open". Hence, as will readily be understood, due to the gap between the conductor 16 at its terminal contact member 15 and the contact member 29, it is impossible to connect the rectifier R3 to the arc light source A1. Furthermore, by reason of the fact that the conductor 20 at its terminal contact member 18 is not connected to the contact member 27, when the switch S is in its position at the right, it follows that the switch 22 may not be utilized for energizing the input side of the rectifier R2. Still further, due to the fact that the conductor 21 at its terminal contact member 19 is disconnected from the contact member 32, when the switch S is in the position last noted, it necessarily follows that the switch 23 may not be utilized for energizing the input side of the rectifier R3.

The advantages of the arrangement shown on Fig. 2 should be obvious in view of the description heretofore given in connection with Fig. 1. That is, with the switch S of Fig. 2 in its position at the left, the rectifier R2 is adapted to operate the arc light source A and its motor 14, the rectifier R3 being adapted to operate the arc light source A1 and its motor 14a. Furthermore, when the switch S is in the position last noted, the switch 22 functions to energize only the rectifier R2 while the switch 23 functions to energize only the rectifier R3.

It follows, therefore, that, with the switch 22 closed and with the switch 23 open, the arc light source A is energized by the rectifier R2. If this rectifier should suddenly become defective, it is necessary only to throw the switch S from its position at the left as shown in Fig. 2 to its open position at the right. This operatively connects the rectifier R3 to the arc light source A while leaving the latter under the control of the switch 22.

At the conclusion of the reel of film passing through the projector mechanism of which the arc light source A is a part, if the rectifier R2 has not been repaired, the operator restores the switch S to its position at the left as shown in Fig. 2, opens the switch 22 and closes the switch 23. This energizes the arc light source A1 under the control of the rectifier R3 and, since these operations may be effected in a moment, the continuity of the motion picture projection is not broken to any substantial extent.

As will readily be understood from a consideration of Fig. 2 in connection with the description heretofore given, the opening of either primary line switch 65 entirely deenergizes the associated rectifier unit. Thus, should the rectifier R2 become defective, the primary line switch 65 therefor may be opened while leaving closed the primary line switch 65 for the rectifier R3. Under control of the switch S, alternate operation of the arc light units A and A1 may proceed with energy supplied from the single rectifier R3 and, while operation is thus proceeding, the rectifier R2 may be repaired free from any danger of electrical shock.

The principle of operation of both the arrangements of Figs. 1 and 2 will be recognized as substantially the same. As the arrangement of Fig. 1 is shown, the switches 22 and 23 are included in the circuit between the input source of current and the rectifier units R and R1 and, hence, closure of either of these switches causes the full line current to pass therethrough. Obviously, the circuits of Fig. 1 in which the respective switches 22 and 23 are included may be regarded as control circuits which, at the rectifiers R and R1, are adapted to operate suitable switches whereby any suitable operating current is applied to the input sides of said rectifiers. It is an arrangement of this character that is shown in Fig. 2 wherein the electrical current that traverses the control circuits including the switches 22 and 23 does not pass through the input sides of the rectifiers R2 and R3 although, from the viewpoint of practical operation, it is desirable that the control current be obtained from one of the phases of the three phase system as shown.

In the foregoing and other respects, the arrangement of Fig. 2 will be recognized as more commercial and practical from an operative viewpoint than is the generally equivalent system of Fig. 1.

Although the invention has been described in connection with the operation of arc light sources by suitable rectifiers, it shall be understood that the invention is not to be so limited. As well, in some of the broader aspects of the invention, electrical distributing units, such as one or a group of transformers may be connected by the switching system of the invention to such energy-consuming devices as one or a group of motors, or equivalent. It shall be understood that some of the appended claims cover the invention in the broader manner referred to above.

In the appended claims, the expression "energy-consuming arrangement" and "electrical distributing unit" shall be understood as defining a single arrangement or unit or as defining a plurality of individual arrangements or units grouped or banked to form a "single" arrangement or unit from an operating viewpoint. It shall also be understood that an "energy-consuming arrangement" may include a single device, a plurality of similar or even a plurality of dissimilar devices. Thus, for example, as herein shown, an energy-consuming "arrangement" may comprise an arc light and an electrical motor.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In combination, a plurality of arc light sources for individual motion picture projectors, a rectifier for each of said arc light sources, a connection from terminals of the same potential of each rectifier to corresponding electrodes of said arc light sources, spaced contact members connected to individual terminals of said rectifiers having a potential opposite to said potential above noted, and a switch for connecting said contact members alternately to the other electrodes of said arc light sources.

2. In combination, a plurality of arc light sources for individual motion picture projectors, a motor associated with each arc light source for controlling movement of the electrodes thereof with respect to each other, a rectifier for each of said arc light sources, a connection from terminals of the same potential of each rectifier to corresponding electrodes of said arc light sources, a connection from other terminals of the same potential of each rectifier to corresponding terminals of said motors, spaced contact members connected to individual terminals of said rectifiers having a potential opposite to said potential above noted, and a switch for connecting said contact members alternately to the other electrodes and the other motor terminals of said arc light sources.

3. In combination, a plurality of arc light sources for individual motion picture projectors, a rectifier for each of said arc light sources, a connection from terminals of the same potential of each rectifier to corresponding electrodes of said arc light sources, spaced contact members connected to individual terminals of said rectifiers having a potential opposite to said potential above noted, a switch for connecting said contact members alternately to the other electrodes of said arc light sources, means forming an input circuit for said rectifiers, and means included in said input circuit for energizing said rectifiers alternately.

4. In combination, a plurality of arc light sources for individual motion picture projectors, a rectifier for each of said arc light sources, a connection from terminals of the same potential of each rectifier to corresponding electrodes of said arc light sources, spaced contact members connected to individual terminals of said rectifiers having a potential opposite to said potential above noted, a switch for connecting said contact members alternately to the other electrodes of said arc light sources, means forming an input circuit for said rectifiers, and means included in said input circuit for energizing said rectifiers alternately, said last named means comprising a switch associated with each arc light source.

DONALD W. COOTE.